(12) United States Patent
Motomiya et al.

(10) Patent No.: US 10,793,072 B2
(45) Date of Patent: Oct. 6, 2020

(54) ELECTRIC RETRACTABLE VIEW DEVICE FOR VEHICLE

(71) Applicant: MURAKAMI CORPORATION, Shizuoka (JP)

(72) Inventors: Masahiro Motomiya, Fujieda (JP); Kenji Ichikawa, Shizuoka (JP); Takayuki Miyazaki, Fujieda (JP); Mizuki Toyama, Kakegawa (JP)

(73) Assignee: MURAKAMI CORPORATION, Shizuoka (JP)

( * ) Notice: Subject to any disclaimer, the term of this patent is extended or adjusted under 35 U.S.C. 154(b) by 138 days.

(21) Appl. No.: 15/560,709

(22) PCT Filed: Mar. 18, 2016

(86) PCT No.: PCT/JP2016/058723
§ 371 (c)(1),
(2) Date: Sep. 22, 2017

(87) PCT Pub. No.: WO2016/158500
PCT Pub. Date: Oct. 6, 2016

(65) Prior Publication Data
US 2018/0105113 A1   Apr. 19, 2018

(30) Foreign Application Priority Data
Mar. 31, 2015   (JP) .................. 2015-071205

(51) Int. Cl.
*B60R 1/07*   (2006.01)
*B60R 1/074*   (2006.01)
(Continued)

(52) U.S. Cl.
CPC .............. *B60R 1/074* (2013.01); *B60R 1/072* (2013.01); *F16C 25/04* (2013.01); *F16D 41/07* (2013.01);
(Continued)

(58) Field of Classification Search
CPC . B60R 1/074; B60R 1/072; F16H 1/16; F16H 55/06; F16H 55/24; F16H 57/021;
(Continued)

(56) References Cited

U.S. PATENT DOCUMENTS

| | | | |
|---|---|---|---|
| 6,679,610 | B2 | 1/2004 | Yamauchi |
| 6,871,969 | B2 | 3/2005 | Yamauchi et al. |

(Continued)

FOREIGN PATENT DOCUMENTS

| | | |
|---|---|---|
| CN | 1383407 A | 12/2002 |
| CN | 1397453 A | 2/2003 |

(Continued)

OTHER PUBLICATIONS

Japanese Office Action for JP App. No. 2015-071205 dated Jul. 3, 2018, along with English-language translation thereof.

(Continued)

*Primary Examiner* — Stephone B Allen
*Assistant Examiner* — Rahman Abdur
(74) *Attorney, Agent, or Firm* — Greenblum & Bernstein, P.L.C.

(57) ABSTRACT

This invention intends to prevent generation of abnormal sound. A motor shaft is inserted in a center hole of a worm and fitted in the center hole in a direction around an axis of the worm. A distal end of the worm is received in a bearing recess. A worm wheel engages with the worm. A radial gap and rotational play are formed between the motor shaft and the center hole of the worm. A radial gap is formed between the distal end of the worm and the bearing recess. The gap between the distal end of the worm and the bearing recess is formed so as to have a size that prevents an outer circumferential surface of the distal end of the worm and an inner circumferential surface of the bearing recess from coming into contact with each other when the worm is rotating.

7 Claims, 7 Drawing Sheets

(51) Int. Cl.
  *B60R 1/072* (2006.01)
  *F16C 25/04* (2006.01)
  *F16D 41/07* (2006.01)
  *F16H 1/16* (2006.01)
  *F16H 55/06* (2006.01)
  *F16H 55/24* (2006.01)
  *F16C 35/02* (2006.01)
  *F16H 57/021* (2012.01)
  *H02K 7/116* (2006.01)

(52) U.S. Cl.
  CPC .............. *F16H 1/16* (2013.01); *F16H 55/06* (2013.01); *F16H 55/24* (2013.01); *F16C 35/02* (2013.01); *F16H 57/021* (2013.01); *F16H 2057/0213* (2013.01); *H02K 7/1166* (2013.01)

(58) Field of Classification Search
  CPC .. F16H 2057/0213; F16C 25/04; F16C 35/02; F16D 41/07; H02K 7/1166
  USPC ......................................................... 359/841
  See application file for complete search history.

(56) References Cited

U.S. PATENT DOCUMENTS

| | | | | |
|---|---|---|---|---|
| 7,290,890 | B2* | 11/2007 | Yoshida | ................. B60R 1/074 |
| | | | | 359/841 |
| 7,441,912 | B2 | 10/2008 | Onuki | |
| 8,764,205 | B2* | 7/2014 | Sakata | .................... B60R 1/076 |
| | | | | 359/841 |
| 2002/0105740 | A1 | 8/2002 | Yamauchi | |
| 2003/0011907 | A1 | 1/2003 | Yamauchi et al. | |
| 2006/0050418 | A1 | 3/2006 | Yoshida et al. | |
| 2008/0084623 | A1 | 4/2008 | Onuki | |
| 2014/0190288 | A1* | 7/2014 | Figura | ..................... B62D 3/04 |
| | | | | 74/89.14 |

FOREIGN PATENT DOCUMENTS

| | | |
|---|---|---|
| CN | 101158397 A | 4/2008 |
| JP | 59-136028 | 9/1984 |
| JP | 4-83939 | 7/1992 |
| JP | 4-95540 | 8/1992 |
| JP | 2001-151020 | 6/2001 |
| JP | 2002-327806 | 11/2002 |
| JP | 2004-306842 | 11/2004 |
| JP | 2006-076408 | 3/2006 |
| JP | 2011-992 | 1/2011 |
| JP | 2014-234878 | 12/2014 |
| JP | 2015-42068 | 3/2015 |

OTHER PUBLICATIONS

Office Action issued in Japanese Counterpart Patent Appl. No. 2015-071205, dated Dec. 4, 2018, along with an English translation thereof.

Office Action issued in China Counterpart Patent Appl. No. 201680020142.1, dated Jan. 30, 2019.

International Search Report issued in International Patent Application No. PCT/JP2016/058723, dated May 24, 2016, along with an English-language translation thereof.

Written Opinion issued in International Patent Application No. PCT/JP2016/058723, dated May 24, 2016, along with an English-language translation thereof.

Office Action issued in Japan Counterpart Patent Appl. No. 2015-071205, dated May 14, 2019, along with an English translation thereof.

* cited by examiner

ELECTRIC RETRACTABLE VIEW DEVICE FOR VEHICLE

The disclosure of Japanese Patent Application No. JP2015-071205 filed on Mar. 31, 2015 including the specification, drawings, claims and abstract is incorporated herein by reference in its entirety.

TECHNICAL FIELD

This invention relates to an electric retractable view device for a vehicle such as an electric retractable mirror for a vehicle or an electric retractable camera for a vehicle, the electric retractable view device preventing generation of abnormal sound.

BACKGROUND ART

As a conventional vehicle door mirror in practical use, there is one including a worm gear (combination of a worm and a worm wheel) configured in such a manner that the worm is fitted on an output shaft (motor shaft) of a motor and the worm wheel is engaged with the worm. In a vehicle door mirror including such worm gear, when electric retracting/extending operation of a rotating section (mirror rotating section) of a door mirror is physically stopped by locking of a stopper at an end for the operation, what is called sticking may occur in the worm gear. Then, once sticking occurs, even if an attempt is made to move the mirror rotating section in an opposite direction next time, a failure in which the mirror rotating section does not move may occur because the stuck state is not cancelled. Therefore, in order to avoid such failure, there is a vehicle door mirror in which a radial gap and rotational play are provided between a motor shaft and a center hole of a worm. In this case, fitting in the rotation direction between the motor shaft and the center hole of the worm is performed by, for example, fitting between an engagement rod at a distal end of the motor shaft and an engagement hole at a distal end of the center hole of the worm. The rotational play is provided by loose fitting between the engagement rod and the engagement hole in the rotation direction. Then, the radial gap and the rotational play between the motor shaft and the center hole of the worm enable rotation of the worm relative to the motor shaft by the amount of the play. Accordingly, upon the motor being driven in a direction opposite to a direction of last electric retracting/extending operation in a state in which sticking occurs in the worm gear, the motor shaft rotates at idle by the amount of the play, enabling provision of large rotation torque to the worm. Consequently, the stuck state is cancelled, enabling the mirror rotating section to be moved in the direction opposite to that of the last time. However, according to such configuration, since there is the radial gap between the motor shaft and the center hole of the worm, during rotation of the worm, the worm may be moved or inclined radially relative to the motor shaft. Such radial movement or inclination of the worm may cause instable operating sound during rotation of the worm.

As a conventional technique intended to stabilize operating sound in a vehicle door mirror including a structure for cancelling a stuck state of a worm gear such as above, there is one described in Patent Literature 1 below. The vehicle door mirror described in Patent Literature 1 has the following configuration. Reference numerals in parentheses are reference numerals used in Patent Literature 1. A shaft support (46A) at a distal end of a worm (46) is rotatably supported in a shaft support hole (26) of a case (24). A motor shaft (40) of a motor (36) is rotatably supported in the shaft support hole (26) of the case (24) via the shaft support (46A) of the worm (46) at an engagement shaft (44) at a distal end of the motor shaft (40). In other words, the motor shaft (40) is inserted to a depth that allows the motor shaft (40) to be supported in the shaft support hole (26) of the case (24), in the worm (46). Consequently, at the time of the motor (36) being driven, distortion of an axis of the worm (46) due to a load input from a worm wheel (58) to the worm (46) is suppressed, whereby the axial center of the worm (46) is stabilized and operating sound is thus stabilized.

CITATION LIST

Patent Literature

Patent Literature 1: Japanese Patent Laid-Open No. 2011-992 (FIG. 1)

SUMMARY OF INVENTION

Technical Problem

According to the configuration described in Patent Literature 1, the worm (46) rotates while an outer circumferential surface of the shaft support (46A) is in contact with an inner circumferential surface of the shaft support hole (26). At this time, inclination of the worm (46) relative to the motor shaft (40) caused by a radial gap between the motor shaft (40) and a center hole (50) of the worm (46) results in instability in position of contact between the outer circumferential surface of the shaft support (46A) of the worm (46) and the inner circumferential surface of the shaft support hole (26) and thus results in generation of abnormal sound.

This invention is intended to provide an electric retractable view device for a vehicle, the electric retractable view device preventing generation of abnormal sound.

Technical Problem

This invention is intended to prevent generation of abnormal sound by forming a radial gap between a distal end of a worm and a bearing recess that receives and supports the distal end of the worm so as to have a size that prevents an outer circumferential surface of the distal end of the worm and an inner circumferential surface of the bearing recess from coming into contact with each other when the worm is rotating.

An aspect of electric retractable view device for a vehicle according to this invention includes: a motor; a worm including a center hole allowing a motor shaft of the motor to be inserted thereto, thereby the worm being fitted on the motor shaft in a direction around an axis and being driven to rotate; a bearing recess that receives and supports a distal end of the worm; and a worm wheel that engages with the worm and rotates following the worm, and the view device is configured so that rotation of the worm wheel is transmitted to a view device rotating section of the view device to rotate the view device rotating section in a direction around an axis of rotation relative to a vehicle body and thereby move the view device rotating section to an extended position and a retracted position, a radial gap and rotational play are formed between the motor shaft and the center hole of the worm, a radial gap is formed between the distal end of the worm and the bearing recess, and the radial gap between the distal end of the worm and the bearing recess is formed so as to have a size that prevents an outer circumferential surface of the distal end of the worm and an inner circumferential surface of the bearing recess from coming into contact with each other when the worm is rotating. Accordingly, as a result of the radial gap being formed between the motor shaft and the center hole of the worm, at the time of rotation of the worm, even if the worm is radially moved or inclined relative to the motor shaft, contact between the outer circumferential surface of the distal end of the worm and the inner circumferential surface of the bearing recess can be avoided, enabling prevention of generation of abnormal sound.

In the electric retractable view device for a vehicle according to this invention, it is possible that the radial gap between the distal end of the worm and the bearing recess is formed so as to be larger than the radial gap between the motor shaft and the center hole of the worm. Accordingly, at the time of rotation of the worm, even if the worm is radially moved or inclined relative to the motor shaft, contact between the outer circumferential surface of the distal end of the worm and the inner circumferential surface of the bearing recess can be avoided, enabling prevention of generation of abnormal sound.

In the electric retractable view device for a vehicle according to this invention, it is possible that a position of the worm wheel is set in an axis direction of the motor shaft in such a manner that a line extending through a position of a center of the worm wheel and orthogonal to the axis direction of the motor shaft extends through an area in which the motor shaft is present in the axis direction of the motor shaft. If the position of the worm wheel is set in the axis direction of the motor shaft in such a manner that the line extending through the position of the center of the worm wheel and orthogonal to the axis direction of the motor shaft extends through an area in which the motor shaft is not present in the axis direction of the motor shaft (further distal area relative to the distal end of the motor shaft), a force of the worm wheel pressing the worm acts at a position that is further distal relative to the distal end of the motor shaft. Thus, the radial gap between the motor shaft and the center hole of the worm causes the worm to be inclined relative to the motor shaft with the distal end position of the motor shaft as a point of support. On the other hand, where the position of the worm wheel is set in the axis direction of the motor shaft in such a manner that the line extending through the position of the center of the worm wheel and orthogonal to the axis direction of the motor shaft extends through the area in which the motor shaft is present in the axis direction of the motor shaft, the force of the worm wheel pressing the worm acts directly on the area in which the motor shaft is present. Thus, no such inclination of the worm with the distal end position of the motor shaft as a point of support occurs. Consequently, inclination of the worm in the axis direction of the motor shaft when the worm is rotating can be reduced. Therefore, even where the outer circumferential surface of the distal end of the worm and the inner circumferential surface of the bearing recess are not in contact with each other, the worm can be rotated stably.

In the electric retractable view device for a vehicle according to this invention, it is possible that: the motor shaft includes a non-engagement rod on a proximal end side and an engagement rod on a distal end side along the axis direction of the motor shaft; the center hole of the worm includes a non-engagement hole on a proximal end side and an engagement hole on a distal end side along an axis direction of the center hole; in a state in which the motor shaft is inserted in the center hole of the worm, the non-engagement rod and the non-engagement hole face each other so as to be unengageable with each other in respective directions around axes of the non-engagement rod and the non-engagement hole, and the engagement rod and the engagement hole face each other so as to be engageable with each other in respective directions around axes of the engagement rod and the engagement hole; and the position of the worm wheel is set in the axis direction of the motor shaft in such a manner that the line extending through the position of the center of the worm wheel and orthogonal to the axis direction of the motor shaft extends through an area in which the non-engagement rod is present in the axis direction of the motor shaft. If the position of the worm wheel is set in the axis direction of the motor shaft in such a manner that the line extending through the position of the center of the worm wheel and orthogonal to the axis direction of the motor shaft extends through an area in which the engagement rod is present in the axis direction of the motor shaft, the force of the worm wheel pressing the worm acts on the engagement rod. Thus, change in inclination of the worm relative to the axis direction of the motor shaft occurs depending on a rotational position of the motor shaft, which may result in occurrence of backlash in rotation of the worm. On the other hand, where the position of the worm wheel is set in the axis direction of the motor shaft in such a manner that the line extending through the position of the center of the worm wheel and orthogonal to the axis direction of the motor shaft extends through the area in which the non-engagement rod is present in the axis direction of the motor shaft, the force of the worm wheel pressing the worm acts on the non-engagement rod. Thus, change in inclination of the worm relative to the axis direction of the motor shaft depending on a rotational position of the motor shaft is less likely to occur. Consequently, the worm can be rotated more stably.

In the electric retractable view device for a vehicle according to this invention, it is possible that: when the worm is rotating, the worm is movable in the axis direction of the motor shaft relative to the motor shaft by a very short distance; and movement of the worm in a direction toward the distal end of the worm is locked by abutment between a distal end face in the axis direction of the worm and a bottom surface of the bearing recess. Accordingly, since the worm is axially movable relative to the motor shaft by a very short distance, the worm is prevented from being compressed from the axially-opposite sides simultaneously during rotation and thus smooth rotation of the worm can be maintained.

DESCRIPTION OF EMBODIMENT

Figure 2:
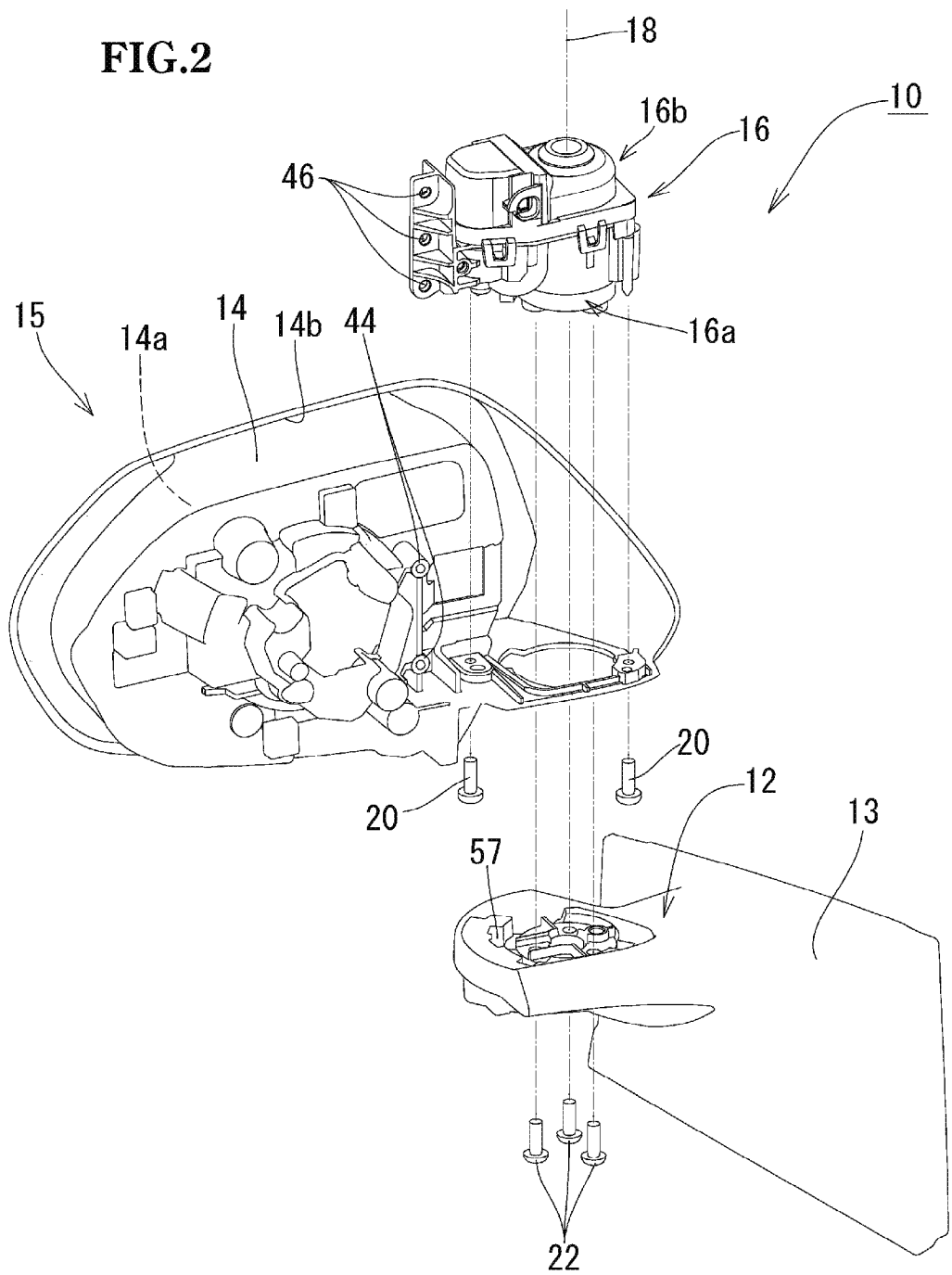
FIG. 2 is an exploded perspective view of an electric retractable door mirror for the right side of a vehicle according to an embodiment of this invention.

An embodiment of this invention will be described. FIG. 2 is an exploded perspective view of an electric retractable door mirror for the right side of a vehicle, to which this invention is applied. FIG. 2 illustrates a state of a mirror rotating section (view device rotating section) 15 in an extended position as viewed from the back side (vehicle front side). Also, in FIG. 2, illustration of, e.g., a mirror surface adjustment actuator and a mirror plate both disposed in a front opening 14a of a visor 14 and a housing cover (reference numeral 17 in FIG. 6) fitted on the back side of the visor 14 is omitted. This door mirror 10 includes a mirror base 12, the mirror rotating section 15, and an electric retracting unit 16 connected between the mirror base 12 and the mirror rotating section 15. The mirror rotating section 15 includes the visor 14. The mirror base 12 is provided so as to protrude from a vehicle body (right door) 13 to the right of the vehicle. The electric retracting unit 16 includes a fixed body 16a in a lower part and a rotating body 16b in an upper part. The rotating body 16b is rotatable relative to the fixed body 16a in a direction around a rotation axis 18. The rotating body 16b of the electric retracting unit 16 is fixed to the back side of the visor 14 by screwing two screws 20 into the rotating body 16b of the electric retracting unit 16 from a lower surface of the visor 14. In a state in which the rotating body 16b is fixed to the visor 14, the fixed body 16a of the electric retracting unit 16 is fixed to the mirror base 12 by screwing three screws 22 into the fixed body 16a of the electric retracting unit 16 from a lower surface of the mirror base 12. Consequently, the mirror rotating section 15 including the visor 14 is attached to and thereby supported on the mirror base 12 via the electric retracting unit 16 so as to be rotatable in the direction around the rotation axis 18. The housing cover (reference numeral 17 in FIG. 6) not illustrated in FIG. 2 is fitted to a back surface of the visor 14. Consequently, an opening 14b in the back surface of the visor 14 is occluded by the housing cover 17, and as a result, the electric retracting unit 16 is housed in a space surrounded by the visor 14 and the housing cover 17. The mirror rotating section 15 rotates upon being electrically driven by the electric retracting unit 16 and is movable alternatively to a retracted position and the extended position. Also, the mirror rotating section 15 is movable from the retracted position to a forward-tilted position through the extended position and vice versa upon being rotated by an external force.

Figure 3:
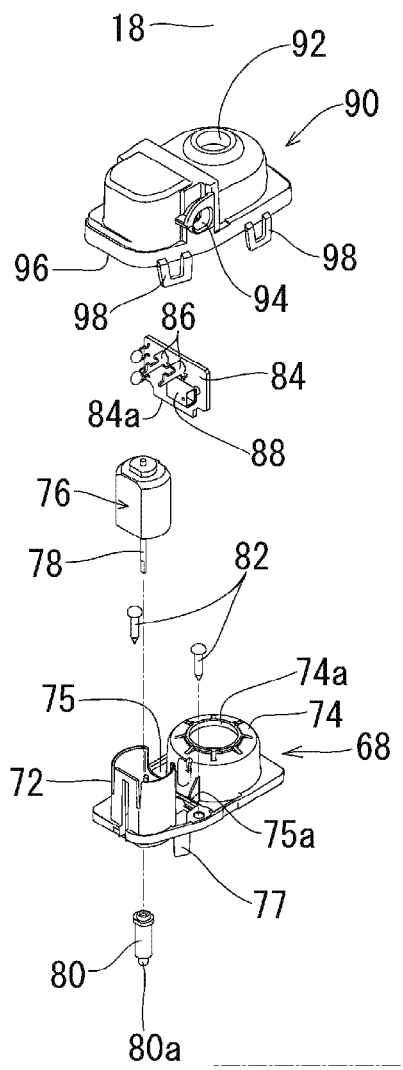
FIG. 3 is an exploded perspective view of the electric retracting unit 16 illustrated in FIG. 2.
Figure 3:
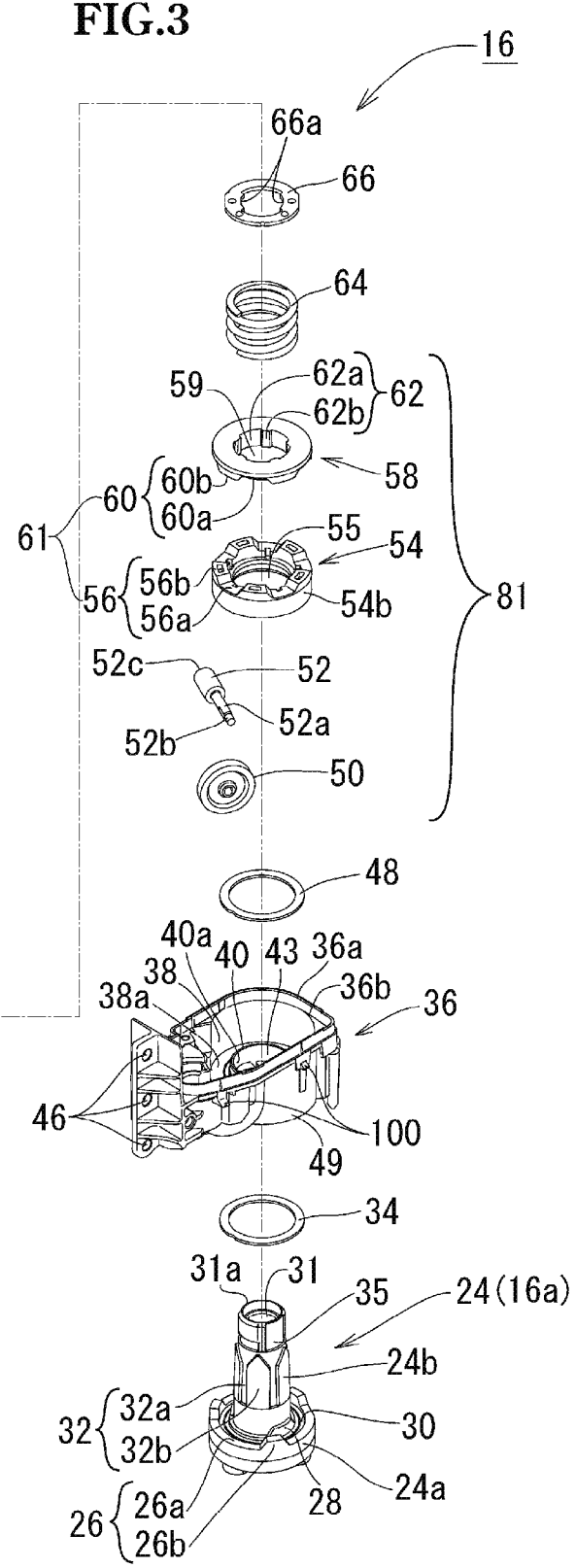

An overall configuration of the inside of the electric retracting unit 16 will be described mainly with reference to FIG. 3. All of the components in FIG. 3 are detachably assembled into the electric retracting unit 16. The electric retracting unit 16 includes a shaft 24 forming the fixed body 16a. The shaft 24 is formed of an integrally-molded product of a reinforced resin such as PA+GF resin (glass fiber-reinforced polyimide resin). The shaft 24 coaxially includes a shaft base 24a having a large diameter and a disk-like shape in a lower part and a shaft axle 24b having a small diameter and a cylindrical shape in an upper part. The shaft 24 is provided upright so as to be orthogonal to the mirror base 12 by fixing a lower surface of the shaft base 24a to the mirror base 12 via the screws 22 (FIG. 2). A crest-valley repeated shape 26 is formed at an outermost circumferential position in an upper surface of the shaft base 24a. The crest-valley repeated shape 26 is formed of three sets of a crest 26b and a valley 26a alternately arranged in a direction around the axis of the shaft 24, the sets being each arranged with an angle of 120 degrees. A circumferential length (angle) of one valley 26a is longer than a circumferential length (angle) of one crest 26b. Also, two height maintaining protrusions 28 are formed at respective innermost circumferential positions in the upper surface of the shaft base 24a. These two height maintaining protrusions 28 are disposed so as to be spaced 180 degrees in the direction around the axis of the shaft 24 from each other and are connected to an outer circumferential surface of the shaft axle 24b. Top surfaces of the height maintaining protrusions 28 and top surfaces of height maintaining protrusions 41 of a later-described frame 36 are in abutment with and slide on each other when the mirror rotating section 15 is moved from the extended position toward the forward-tilted position by an external force. The abutment and sliding between the top surfaces causes the height maintaining protrusions 28 to maintain a height of the frame 36 relative to the shaft 24 and thereby enable the mirror rotating section 15 to be electrically returned from the forward-tilted position to the extended position. Also, a bearing surface 30 is formed at a radial position between the crest-valley repeated shape 26 at the outermost circumferential position and the height maintaining protrusions 28 at the innermost circumferential position in the upper surface of the shaft base 24a. The bearing surface 30 is formed so as to have a groove shape having a constant width, have an annular shape in the direction around the axis of the shaft 24 and be flat. A resin washer 34 is placed and received in the groove of the bearing surface 30. A hollow 31 of the shaft axle 24b is provided so as to extend through the shaft base 24a. A non-illustrated wire harness that supplies electric power to, e.g., the electric retracting unit 16 and the mirror surface adjustment actuator is inserted through the hollow 31. A rotation preventing shape 32 is formed at the outer circumferential surface of the shaft axle 24b. The rotation preventing shape 32 is formed of five sets of a rotation preventing recess 32a and a rotation preventing projection 32b arranged alternately circumferentially, the sets being each arranged with a same circumferential length. The respective rotation preventing recesses 32a and the respective rotation preventing projections 32b are configured so as to extend in the axis direction of the shaft 24. An upper end of each rotation preventing recess 32a opens upward in order to allow entry of a corresponding rotation preventing projection (a rotation preventing projection 62b formed on an inner circumferential surface of a later-described clutch plate 58) to be fitted in the rotation preventing recess 32a. In an outer circumferential surface of an upper part of the shaft axle 24b, grooves 35 for allowing a later-described metal plate 66 to be put onto the upper part of the shaft axle 24b and to be rotated and to be held at the upper part of the shaft axle 24b are formed.

Figure 4:
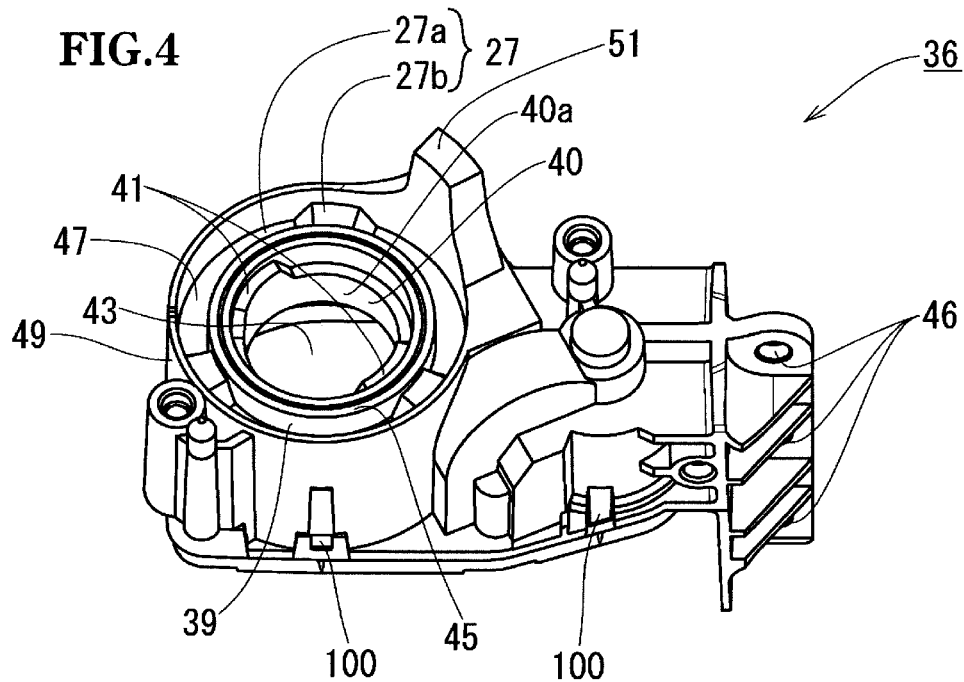
FIG. 4 is a perspective view of the frame 36 illustrated in FIG. 3 as viewed from the bottom side.

The frame 36 of the rotating body 16b is rotatably supported on the shaft 24. The frame 36 is formed of an integrally-molded product of a reinforced resin such as PA+GF resin. The frame 36 includes an inner space 38 that opens upward. At a bottom surface 38a of the inner space 38, a cylinder 40 is provided upright. A hollow 43 of the cylinder 40 extends through the bottom surface 38a. Here, the referenced drawing will temporarily be moved from FIG. 3 to FIG. 4 to describe a configuration of a lower surface of the frame 36. On the lower surface of the frame 36, a cylinder 39 is provided so as to protrude downward (upward in FIG. 4). The cylinder 39 is disposed coaxially with the cylinder 40. Also, the cylinder 39 is larger in diameter and thickness than the cylinder 40. On an inner circumferential surface of the cylinder 39, two height maintaining protrusions 41 are formed. These two height maintaining protrusions 41 are disposed so as to be spaced 180 degrees in a direction around an axis of the cylinder 39 from each other and are connected to the inner circumferential surface of the cylinder 39. The top surfaces of the two height maintaining protrusions 41 and the top surfaces of the two height maintaining protrusions 28 (FIG. 3) of the shaft base 24a are in abutment with and slide on each other. An inner circumferential surface of each height maintaining protrusion 41 is located at a same radial position as the inner circumferential surface 40a of the cylinder 40, and both inner circumferential surfaces form a continuous surface. The height maintaining protrusions 28, 41 are located at a same radial position. A lower end face of the cylinder 39 forms a bearing surface 45 that faces the bearing surface 30 of the shaft 24. On the outer side of the cylinder 39, an outer barrel 49 is disposed coaxially with the cylinder 39 with a void 47 therebetween. Inside the void 47, a crest-valley repeated shape 27 to be fitted to the crest-valley repeated shape 26 (FIG. 3) in the upper surface of the shaft base 24a is formed. The crest-valley repeated shape 27 is formed of three sets of a crest 27b and a valley 27a alternately arranged in the direction around the axis of the cylinder 39, the sets being each arranged with an angle of 120 degrees. A circumferential length (angle) of one valley 27a is longer than a circumferential length (angle) of one crest 27b. Each crest 27b is disposed so as to be connected to an outer circumferential surface of the cylinder 39, an inner circumferential surface of the outer barrel 49 and a bottom surface of the void 47. In a partial circumferential area of the outer barrel 49, a stopper 51 is formed so as to protrude downward (upward in FIG. 4). The stopper 51 is inserted to a stopper groove 57 (FIG. 2) formed in the mirror base 12 so as to be movable circumferentially, and thus sets a maximum rotation range (from the retracted position to the forward-tilted position) of the mirror rotating section 15. The shaft axle 24b is inserted to a continuous hollow 43 of the cylinders 39, 40 of the frame 36 from the cylinder 39 side. At this time, the bearing surface 45 of the frame 36 is bearing-supported by the bearing surface 30 of the shaft 24 with the resin washer 34 therebetween. Also, the inner circumferential surface 40a of the cylinder 40 on the upper side is rotatably supported by the shaft axle 24b. Consequently, the frame 36 is supported by the shaft 24 so as to be rotatable in the direction around the axis of the shaft 24. The crests 26b of the crest-valley repeated shape 26 of the shaft 24 enters the void 47 in a bottom of the frame 36. In this state, the crest-valley repeated shape 26 and the crest-valley repeated shape 27 are fitted together so as to be slidable on each other in both rotation directions within a predetermined angle range. In other words, the crest-valley repeated shape 26 and the crest-valley repeated shape 27 can slide on each other in both rotation directions until an inclined surface of a boundary between each crest 26b and the corresponding valley 26a and an inclined surface of a boundary between each crest 27b and the corresponding valley 27a are brought into abutment with and thereby locked by each other (or, in the retracting direction, until the stopper 51 is locked by one end of the stopper groove 57). This sliding allows the mirror rotating section 15 (FIG. 2) to rotate between the retracted position and the extended position. Also, when an external force directed to the front side of the vehicle, the external force having a predetermined value or more, is applied to the mirror rotating section 15 in the extended position, the crests 26b and the crests 27b mutually slide up on the inclined surfaces of the respective opposite crests against a biasing force of a later-described coil spring 64 and move onto the top surfaces of the respective opposite crests, whereby the fit between the crest-valley repeated shape 26 and the crest-valley repeated shape 27 is cancelled. The cancellation of the fit allows the mirror rotating section 15 to rotate to the forward-tilted position. On one side of the frame 36, screw through holes 46 for screw-fastening and thereby fixing the frame 36 to bosses 44 (FIG. 2) provided at two, upper and lower, positions in the back surface of the visor 14 are formed. In this embodiment, the screw through holes 46 are provided at three, upper, intermediate and lower, positions. From among the screw through holes 46, screws (not illustrated) are inserted to the screw through holes 46 at the two, upper and lower, positions and screwed into the bosses 44 at the two, upper and lower, positions, whereby the frame 36 is fixed to the back surface of the visor 14.

Figure 5:
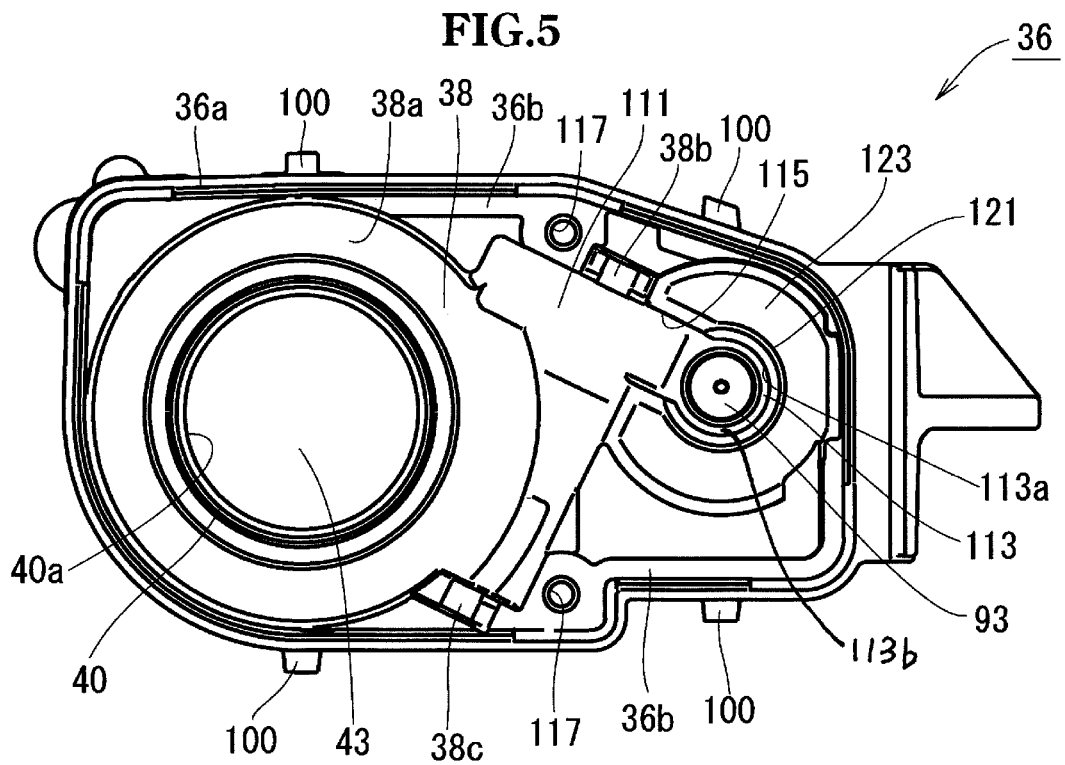
FIG. 5 is a plan view of the frame 36 illustrated in FIG. 3.
Figure 6:
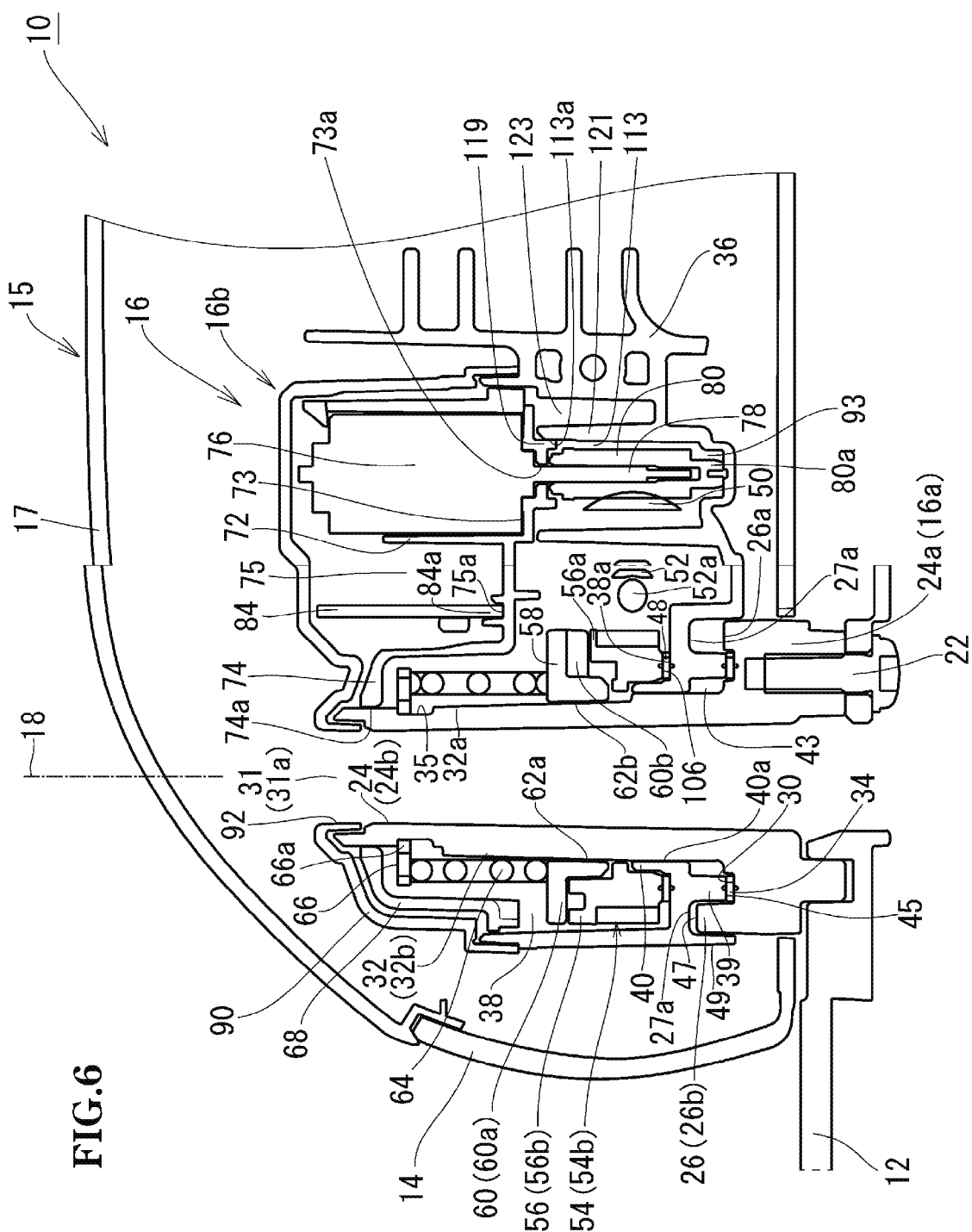
FIG. 6 is a diagram illustrating an assembled state of the door mirror in FIG. 2 and is a diagram of an end face of the door mirror cut at a position extending through respective center axes of a shaft 24 and a motor 76.

Referring back to FIG. 3, a resin washer 48 is loosely fitted on an outer circumference of the cylinder 40 in the inner space 38 of the frame 36. The resin washer 48 is placed and supported on the bottom surface 38a of the inner space 38. The resin washer 48 is a product that is the same as the resin washer 34. An axle 52a of a metal worm 52 is inserted to a resin worm wheel 50, whereby the worm wheel 50 and the worm 52 are assembled to each other so as to be unrotatable relative to each other. The assembled worm wheel 50 and worm 52 are put in the inner space 38 of the frame 36 and disposed at a predetermined position. At this time, lower surfaces of opposite ends 52b, 52c of the axle 52a of the worm 52 are placed and supported on bearings (reference numerals 38b, 38c in FIGS. 5 and 7) in the inner space 38. Consequently, the worm wheel 50 and the worm 52 can rotate integrally in the inner space 38. A shaft outside-fitting gear 54 is rotatably fitted on the outer circumference of the cylinder 40 in the inner space 38 of the frame 36. The shaft outside-fitting gear 54 is formed of an integrally-molded product of a reinforced resin such as PA+GF resin. A hollow 55 is formed in a center of a surface of the shaft outside-fitting gear 54 as viewed in an axis direction of the shaft outside-fitting gear 54. The cylinder 40 of the frame 36 and the shaft axle 24b are rotatably inserted to the hollow 55. A bearing surface 106 (FIG. 6) in a lower surface of the shaft outside-fitting gear 54 is slidably placed and supported on the resin washer 48 (FIG. 6). At an outer circumferential surface of the shaft outside-fitting gear 54, gear teeth 54b of a helical gear are formed. Consequently, the shaft outside-fitting gear 54 forms a worm wheel. The gear teeth 54b engage with the worm 52. Consequently, the shaft outside-fitting gear 54 and the worm 52 form a worm gear. A shaft outside-fitting gear-side clutch surface 56 is formed at an upper surface of the shaft outside-fitting gear 54. The shaft outside-fitting gear-side clutch surface 56 is formed of five sets of a clutch valley 56a and a clutch crest 56b arranged alternately in a direction around an axis of the shaft outside-fitting gear 54, the sets being each arranged with a same circumferential length. A circumferential length (angle) of one clutch valley 56a and a circumferential length (angle) of one clutch crest 56b are set to be equal to each other.

The clutch plate 58 is put onto the shaft axle 24b. Consequently, the clutch plate 58 is placed and supported on the shaft outside-fitting gear 54 concentrically with the shaft outside-fitting gear 54. The clutch plate 58 is formed of an integrally-molded product of a reinforced resin such as PA+GF resin. A hollow 59, to which the shaft axle 24b is inserted so as to be unrotatable and movable axially, is formed in a center of a surface of the clutch plate 58 as viewed in an axis direction of the clutch plate 58. At a lower surface of the clutch plate 58, a shaft-side clutch surface 60 is formed, The shaft-side clutch surface 60 is formed of five sets of a clutch valley 60a and a clutch crest 60b arranged alternately in a direction around the axis of the clutch plate 58, the sets being each arranged with a same circumferential length. The shaft outside-fitting gear-side clutch surface 56 and the shaft-side clutch surface 60 form a clutch mechanism 61. A circumferential length (angle) of one clutch valley 60a and a circumferential length (angle) of one clutch crest 60b of the shaft-side clutch surface 60 are set to be equal to each other. Also, the shaft outside-fitting gear-side clutch surface 56 and the shaft-side clutch surface 60 are equal to each other in inner diameter and outer diameter. Therefore, the clutch valleys 56a and the clutch crests 56b of the shaft outside-fitting gear-side clutch surface 56 are fitted to the clutch crests 60b and the clutch valleys 60a of the shaft-side clutch surface 60 with no backlash. A height changing part at a position of a boundary between each clutch valley 56a and the relevant clutch crest 56b and a height changing part at a position of a boundary between each clutch valley 60a and the relevant clutch crest 60b are formed of respective inclined surfaces, inclination angles of which are equal to each other. Consequently, the fit between the shaft outside-fitting gear-side clutch surface 56 and the shaft-side clutch surface 60 can be cancelled by means of a rotational force acting between these clutch surfaces 56, 60. A rotation preventing shape 62 is formed at an inner circumferential surface of the clutch plate 58. The rotation preventing shape 62 is formed of five sets of a rotation preventing recess 62a and the rotation preventing projection 62b that are arranged circumferentially and extend axially. The rotation preventing recesses 62a and the rotation preventing projections 62b face the rotation preventing projections 32b and the rotation preventing recesses 32a formed at the outer circumferential surface of the shaft axle 24b, respectively, via a small gap. Consequently, the rotation preventing recesses 62a and the rotation preventing projections 62b are fitted to the rotation preventing projections 32b and the rotation preventing recesses 32a so as to be unrotatable in the direction around the axis and slidable axially. As a result, the clutch plate 58 is fitted on the shaft axle 24b so as to be unrotatable in a direction around the axis of the shaft axle 24b and movable axially.

The coil spring 64 is put on the shaft axle 24b. Consequently, the coil spring 64 is placed and supported on the clutch plate 58 concentrically with the clutch plate 58. The metal plate 66 is disposed on the coil spring 64. The coil spring 64 is pressed and contracted by the metal plate 66, whereby the metal plate 66 is put onto the shaft axle 24b. Protrusions 66a formed at an inner circumferential surface of the metal plate 66 are inserted to the grooves 35 formed in the outer circumferential surface of the upper part of the shaft axle 24b and the metal plate 66 is pressed downward, and next, the metal plate 66 is rotated, whereby the metal plate 66 is fitted to the upper part of the shaft axle 24b. Consequently, the coil spring 64 is fitted in a contracted state to the shaft axle 24b. At this time, an expansion force of the coil spring 64 acts between an upper surface of the clutch plate 58 and a lower surface of the metal plate 66. This expansion force provides a fitting force between the crest-valley repeated shape 26 at the upper surface of the shaft base 24a and the crest-valley repeated shape 27 (FIG. 4) at the lower surface of the frame 36 and also between the shaft outside-fitting gear-side clutch surface 56 at the upper surface of the shaft outside-fitting gear 54 and the shaft-side clutch surface 60 at the lower surface of the clutch plate 58. However, when the mirror rotating section 15 is located between the retracted position and the extended position, the expansion force provided from the coil spring 64 to the frame 36 is received by the bearing surface 30 via the resin washer 34 through the bearing surface 45, and thus, rotation of the mirror rotating section 15 is performed by the bearing surfaces 45, 30 sliding on each other with the resin washer 34 therebetween. In other words, the rotation of the mirror rotating section 15 is bearing-supported by the abutment and sliding between the bearing surfaces 45, 30 with the resin washer 34 therebetween. Therefore, at this time, the opposed surfaces of the crest-valley repeated shapes 26, 27 are separated and are neither in abutment with nor slide on each other (see FIG. 6)

After assembly of all of the respective components illustrated on the right side of FIG. 3, an outer plate 68 is placed on a step 36b on the inner circumferential side of an opening 36a at an upper end of the frame 36 and then the opening 36a is thus closed. The outer plate 68 is formed of an integrally-molded product of a resin such as POM (polyacetal). The outer plate 68 includes a barrel 72 and a dome 74 at an upper surface thereof. The barrel 72 receives and holds a motor 76. The dome 74 surrounds an upper part of the shaft axle 24b, the upper part protruding upward from the opening 36a of the frame 36, and the coil spring 64 and the metal plate 66. A circular hole 74a that allows the upper part of the shaft axle 24b to protrude therefrom is provided in a center of a surface of the dome 74 as viewed in an axis direction of the dome. Before the outer plate 68 is put on the frame 36, the motor 76 is inserted to the barrel 72 from above and the motor 76 is thus fitted to the outer plate 68. A motor shaft (rotation axis rod) 78 of the motor 76 protrudes vertically downward below the outer plate 68 through a hole 73a formed in a center of a bottom 73 (FIG. 6) in the barrel 72. A worm 80 is fitted onto the motor shaft 78. In a state in which the outer plate 68 holds the motor 76 and the worm 80 in this way, the outer plate 68 is placed on the step 36b on the inner circumferential side of the opening 36a of the frame 36. At this time, the worm 80 and the worm wheel 50 engage with each other and form a worm gear. Also, the worm 80, the worm wheel 50, the worm 52, the shaft outside-fitting gear 54 and the clutch plate 58 form a power transmission mechanism 81 that transmits a driving force of the motor 76 to the shaft axle 24b. Also, at a lower surface of the outer plate 68, two protruding pieces 77 are formed so as to protrude downward from the lower surface. In FIG. 3, only the near-side protruding piece 77 of the two protruding pieces 77 is shown. The other protruding piece 77 is located on the side diagonally opposed to the near-side protruding piece 77. Lower end faces of the two protruding pieces 77 face upper surfaces of the opposite ends 52b, 52c of the axle 52a of the worm 52 via a small gap, respectively, whereby upward movement of the worm 52 and the worm wheel 50 is restricted. After the placement of the outer plate 68 on the step 36b on the inner circumferential side of the opening 36a of the frame 36, the outer plate 68 is fixed to the frame 36 via two screws 82.

A configuration of the inside of the inner space 38 of the frame 36 will be described with reference to FIG. 5. Inside the inner space 38 of the frame 36, in addition to the components already described, e.g., a worm wheel receiving space 111, a worm receiving space 113, a worm wheel entry port 115 and two screw holes 117 are formed. The worm wheel receiving space 111 receives the worm wheel 50 coaxially fixed and fitted to the axle 52a of the worm 52. At this time, the opposite ends 52b, 52c of the axle 52a of the worm 52 are supported on the bearings 38b, 38c. The worm receiving space 113 is a space that coaxially receives the worm 80, and is formed of a space having a circular column shape having a diameter that is larger than that of the worm 80. The worm wheel entry port 115 causes the worm wheel receiving space 111 and the worm receiving space 113 to communicate with each other. Consequently, the worm wheel entry port 115 causes an outer circumferential surface of the worm wheel 50 to enter the worm receiving space 113 through the worm wheel entry port 115. As a result, the worm wheel 50 and the worm 80 engage with each other. The two screw holes 117 are screw holes for screw-in of the two screws 82 (FIG. 3) for fixing the outer plate 68 onto the frame 36. A bearing recess 93 having a diameter that is smaller than a general diameter of the worm receiving space 113 is formed in a bottom 113b (FIGS. 1 and 5) of the worm receiving space 113. Grease is charged in the bearing recess 93, and a distal end 80a (FIGS. 1 and 3) of the worm 80 is received in the bearing recess 93. Consequently, the distal end 80a of the worm 80 is bearing-supported in the bearing recess 93. At the lower surface of the outer plate 68, a circular projection 119 (FIG. 1) is formed concentrically with the hole 73a (hole for letting the motor shaft 78 through, FIGS. 1 and 6) in the lower surface of the outer plate 68. The projection 119 is received in a circular upper opening 113a of the worm receiving space 113. At this time, the projection 119 is received in the upper opening 113a with no gap (or with almost no gap) therearound except a part facing the worm wheel entry port 115. Consequently, an area that is no less than a half of an entire outer circumferential surface of the projection 119 is surrounded and supported by an inner circumferential surface of the upper opening 113a. As a result, the motor shaft 78 protruding from the hole 73a at a center of the projection 119 is positioned relative to the worm receiving space 113 in a surface direction perpendicular to an axis of the motor shaft 78. Around the worm receiving space 113, a cylindrical wall 121 having a constant thickness is provided, and a deep lightening hole 123 is provided outside the cylindrical wall 121. The lightening hole 123 is formed at a place excluding the part facing the worm wheel entry port 115, and consequently, the lightening hole 123 is formed in a C shape in plan view. The provision of the lightening hole 123 enables suppression of sink marks accompanying resin molding of the frame 36 and thus enables enhancement in molding accuracy of the upper opening 113a of the worm receiving space 113. Consequently, an accuracy of positioning of the motor shaft 78 relative to the worm receiving space 113 in the surface direction perpendicular to the axis of the motor shaft 78 is improved. As a result, the engagement between the worm 80 and the worm wheel 50 is maintained in a normal state, enabling operating sound generated when the worm 80 and the worm wheel 50 rotate in engagement can be maintained at a normal level.

After the fixation of the outer plate 68 to the frame 36, a circuit board (printed board) 84 is disposed upright in a space 75, between the barrel 72 and the dome 74, of the upper surface of the outer plate 68. In the circuit board 84, a motor drive circuit, motor connection terminals 86 and a connector receiving tool 88 are mounted. The motor drive circuit supplies electric drive power to the motor 76. The motor connection terminals 86 interconnect the motor drive circuit and terminals of the motor 76. A connector at a distal end of the wire harness is inserted to the connector receiving tool 88, and as a result, the connector receiving tool 88 interconnects the wire harness and the motor drive circuit. A lower end 84a of the circuit board 84 is inserted to a groove 75a of the outer plate 68, the groove 75a being formed in a bottom of the space 75 between the barrel 72 and the dome 74. Distal ends of the motor connection terminals 86 are inserted to the respective terminals of the motor 76. Consequently, the circuit board 84 is disposed upright in the space 75.

After the fixation of the outer plate 68 to the frame 36 and the attachment of the circuit board 84 to the outer plate 68, a seal cap 90 is put on the outer plate 68. The seal cap 90 is formed of an integrally-molded product of a resin such as PP (polypropylene). In an upper surface of the seal cap 90, a circular hole 92 that communicates with an upper opening 31a of the hollow 31 of the shaft axle 24b is provided. Also, in one side surface of the seal cap 90, a connector insertion port 94 that communicates with the connector receiving tool 88 of the circuit board 84 is provided. Also, at each of four positions around an opening 96 of a lower end of the seal cap 90, a claw locking frame 98 is formed. Upon the seal cap 90 being put on the outer plate 68 and the seal cap 90 being pushed down, claws 100 configured at four positions around an upper outer circumferential surface of the frame 36 so as to protrude therefrom engage with the respective claw locking frames 98 of the seal cap 90. Consequently, the frame 36 and the seal cap 90 are joined, whereby the electric retracting unit 16 is assembled in an integrated manner. The wire harness is inserted through the hollow 31 of the shaft axle 24b of the electric retracting unit 16 assembled in this way. The wire harness includes a wiring for the electric retracting unit 16. In addition, the wire harness includes, e.g., a wiring for the mirror adjustment actuator and a wiring for a turn lamp depending on the functions included in the door mirror 10. An end on the mirror rotating section 15 side of the wire harness is drawn out from the circular hole 92 of the seal cap 90. An end on the vehicle body side of the wire harness is drawn out from a lower end of the hollow 31 of the shaft 24 and guided to the inside of the vehicle body. A connector is fitted to an end on the mirror rotating section 15 side of each wiring in the wire harness. From among the connectors, a connector (not illustrated) for a distal end of the wiring for the electric retracting unit 16 is inserted to the connector insertion port 94 and thereby connected to the connector receiving tool 88 of the circuit board 84.

FIG. 6 illustrates the door mirror 10 having the above-described configuration, the door mirror 10 being cut at a position extending through respective center axes of the shaft 24 and the motor 76. FIG. 6 illustrates a state when the housing cover 17 is fitted to the visor 14, the mirror rotating section 15 is in the extended position and the shaft outside-fitting gear-side clutch surface 56 and the shaft-side clutch surface 60 engage with each other. At this time, although not shown in FIG. 6, the inclined surfaces of the boundaries between the crests 26b and the valleys 26a and the relevant inclined surfaces of the boundaries between the crests 27b and the valleys 27a are in abutment with each other and whereby the crest-valley repeated shape 26 and the crest-valley repeated shape 27 are locked by each other. In the state in which the mirror rotating section 15 is in the extended position in FIG. 6, upon an instruction for retracting being provided by operating a mirror switch, the motor 76 is started. Rotation of the motor 76 is transmitted to the shaft outside-fitting gear 54 via the worm 80, the worm wheel 50 and the worm 52. At this time, the shaft outside-fitting gear-side clutch surface 56 and the shaft-side clutch surface 60 engage with each other, and the shaft outside-fitting gear 54 is thereby unrotatable relative to the shaft axle 24*b*, and thus, instead, a force acts so as to rotate the frame 36 in the direction around the axis of the shaft axle 24*b*. Consequently, the bearing surface 30 and the bearing surface 45 slide on each other with the resin washer 34 therebetween, and the bottom surface 38*a* of the inner space 38 of the frame 36 and the bearing surface 106 of the lower surface of the shaft outside-fitting gear 54 slide on each other with the resin washer 48 therebetween, whereby the mirror rotating section 15 rotates in a retracting direction. Upon the rotation of the mirror rotating section 15 being physically stopped in the retracted position by engagement between the stopper 51 (FIG. 4) and the one end of stopper groove 57 (FIG. 2), the stoppage is detected and the driving of the motor 76 is stopped. Consequently, the mirror rotating section 15 is held in the retracted position. In this state, upon an instruction for extending being provided by operating the mirror switch, the motor 76 is started in a reverse direction, whereby the mirror rotating section 15 rotates in an extending direction. Upon the rotation of the mirror rotating section 15 being stopped in the extended position by engagement between the inclined surfaces of the boundaries between the crests 26*b* and the valleys 26*a* of the crest-valley repeated shape 26 and the inclined surfaces of the boundaries between the crests 27*b* and the valleys 27*a* of the crest-valley repeated shape 27, the stoppage is detected and the driving of the motor 76 is stopped. Consequently, the mirror rotating section 15 is held in the extended position.

Figure 1:
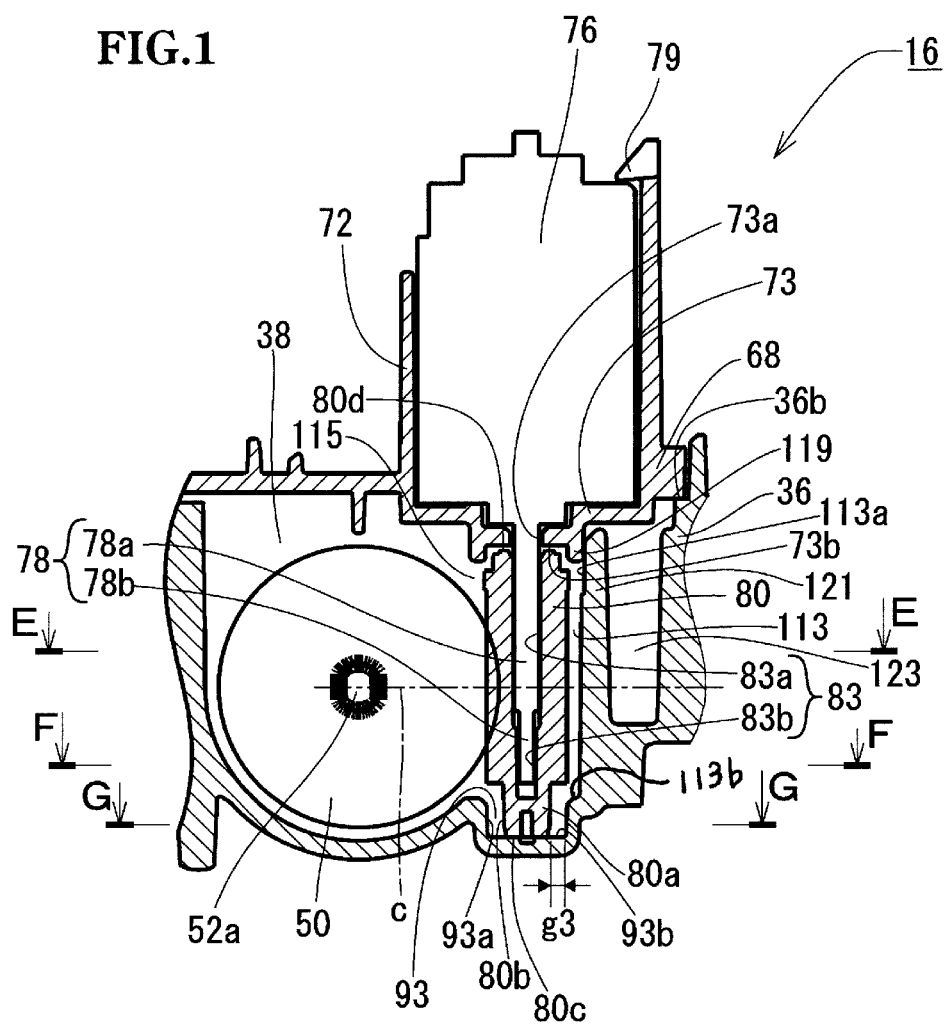
FIG. 1 is a diagram of an end face of the electric retracting unit 16 in FIG. 2 cut at the position indicated by arrows D-D in FIG. 7 with a seal cap 90 (FIG. 3) removed.
Figure 7:
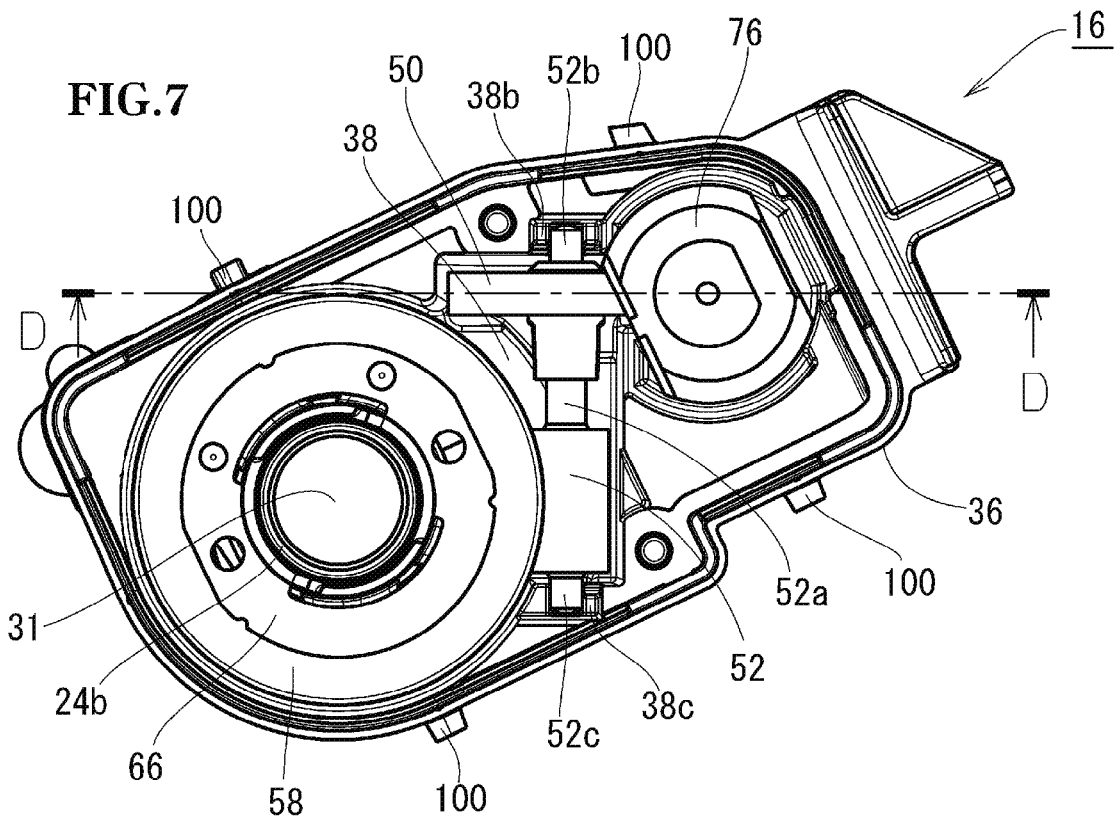
FIG. 7 is a plan view illustrating an assembled state of the electric retracting unit 16 illustrated in FIG. 3, which illustrates the electric retracting unit 16 with an outer plate 68 and a seal cap 90 removed (motor 76 is illustrated).
Figure 8A:
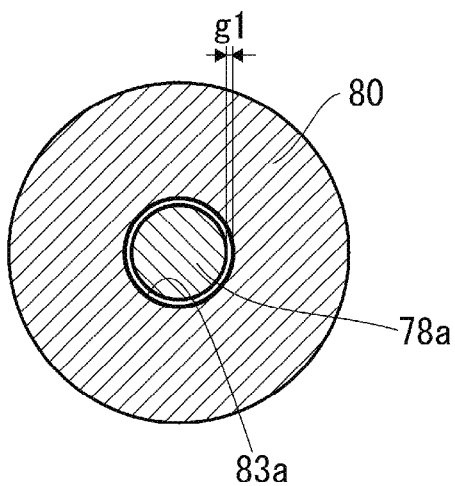
FIG. 8A is a diagram of end faces of a circular rod 78a of a motor shaft 78 and a worm 80 cut at the position indicated by arrows E-E in FIG. 1.
Figure 8B:
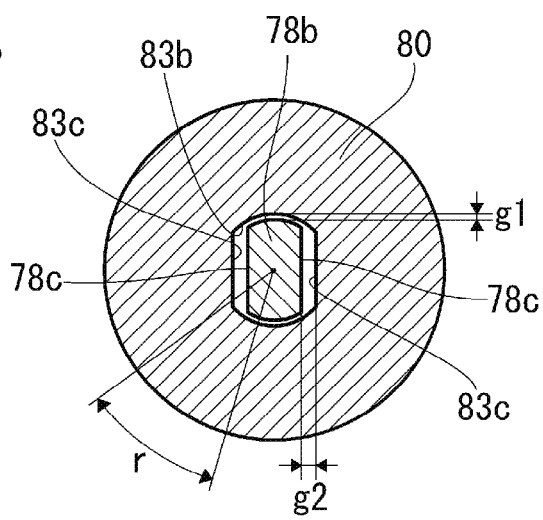
FIG. 8B is a diagram of end faces of an engagement rod 78b of the motor shaft 78 and the worm 80 cut at the position indicated by arrows F-F in FIG. 1.

FIG. 7 is a plan view of the electric retracting unit 16 with the outer plate 68 and the seal cap 90 removed. FIG. 1 is a diagram of an end face of the electric retracting unit 16 cut at the position indicated by arrows D-D in FIG. 7. In FIG. 1, the electric retracting unit 16 is illustrated with the outer plate 68 fitted and the seal cap 90 removed. The arrangement in FIG. 1 will be described. The outer plate 68 is in abutment with and supported on the step 36*b* of the frame 36. The motor 76 is received in the barrel 72 of the outer plate 68. A claw 79 formed at an upper end of the barrel 72 engages with a rear end of the motor 76. Consequently, the motor 76 is held in the barrel 72 with no backlash in all directions. The worm 80 is loosely fitted on the motor shaft 78. In the motor shaft 78, a circular rod (non-engagement rod) 78*a* is formed on the proximal end side and an engagement rod 78*b* is formed on the distal end side along the axis direction thereof. In a center hole 83 of the worm 80, the center hole 83 allowing the motor shaft 78 to be inserted thereto, a circular hole (non-engagement hole) 83*a* is formed on the proximal end side and an engagement hole 83*b* is formed on the distal end side along an axis direction thereof. The circular hole 83*a* receives the circular rod 78*a* and the engagement hole 83*b* receives the engagement rod 78*b*. The circular rod 78*a* and the circular hole 83*a* do not engage with each other in a direction of rotation. The engagement rod 78*b* and the engagement hole 83*b* engage with each other in the direction of rotation. FIG. 8A illustrates a horizontal cross-sectional structure of the circular rod 78*a* and the circular hole 83*a* (structure of end faces cut at the position indicated by arrows E-E in FIG. 1). Between the circular rod 78*a* and the circular hole 83*a*, a radial gap g1 is formed fully circumferentially. FIG. 8B illustrates a horizontal cross-sectional structure of the engagement rod 78*b* and the engagement hole 83*b* (structure of end faces cut at the position indicated by arrows F-F in FIG. 1). The engagement rod 78*b* is formed in a flat rod shape including two surfaces 78*c*, 78*c* parallel to each other, by cutting opposed surfaces of the distal end of the circular rod 78*a*. The engagement hole 83*b* is formed in a flat hole shape including two surfaces 83*c*, 83*c* parallel to each other, by decreasing a space between opposed surfaces of the distal end of the circular hole 83*a*. A gap g2 between the surfaces 78*c*, 83*c* is larger than the gap g1. The radial gap g1 between the motor shaft 78 and the center hole 83 of the worm 80 and the gap g2 between the surface 78*c* of the engagement rod 78*b* and the surface 83*c* of the engagement hole 83*b* provide rotational play r between the engagement rod 78*b* and the engagement hole 83*b*. In other words, in a state in which coupling between the motor shaft 78 and the worm 80 is loosened by the radial gap g1 between the motor shaft 78 and the center hole 83 of the worm 80, the rotational play r is provided by the gap g2 between the surface 78*c* of the engagement rod 78*b* and the surface 83*c* of the engagement hole 83*b*, whereby the worm 80 can rotate at idle relative to the motor shaft 78 by the amount of the play r. Consequently, even if sticking occurs, e.g., between the worm 80 and the worm wheel 50 in last driving, the stuck state can be cancelled by next-time driving in an opposite direction. On the other hand, since there is the gap g1 between the motor shaft 78 and the center hole 83 of the worm 80, when the worm 80 rotates following rotation of the motor shaft 78, the worm 80 is radially moved or inclined relative to the motor shaft 78.

Figure 8C:
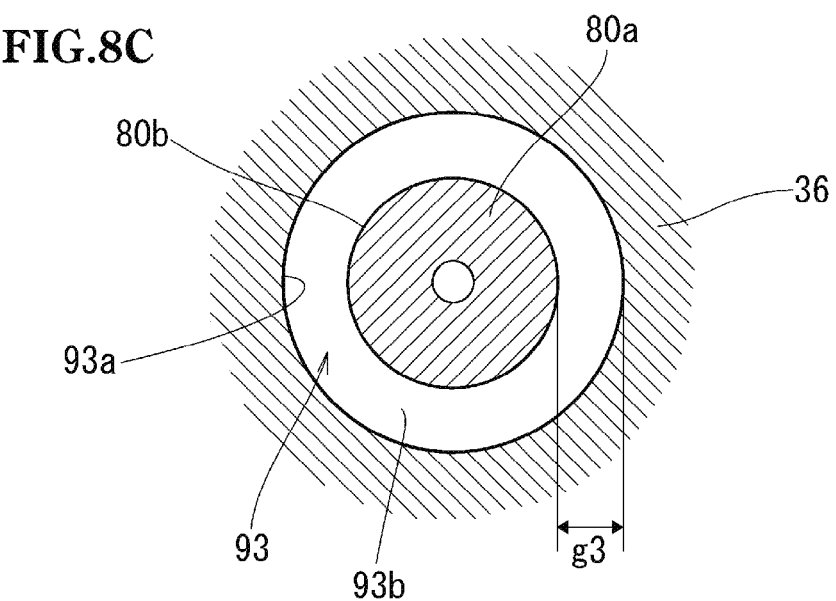
FIG. 8C is a diagram of end faces of a distal end 80a of the worm 80 and a bearing recess 93 cut at the position indicated by arrows G-G in FIG. 1.

In FIG. 1, the distal end 80*a*, which is not threaded, of the worm 80 is formed in a circular rod shape having a diameter that is smaller than that of a threaded part of the worm 80. In a bottom of the inner space 38 of the frame 36, the cylindrical bearing recess 93 is formed at a position just below the worm 80. The distal end 80*a* of the worm 80 is coaxially received in the bearing recess 93, and a distal end face 80*c* of the worm 80 is in abutment with and supported on a bottom surface 93*b* of the bearing recess 93. Grease (not illustrated) is charged in the bearing recess 93. The grease is held in the bearing recess 93 that functions as a grease reservoir, and thus, smooth rotation of the worm 80 is maintained for a long period of time. A space between a center lower surface 73*b* of the bottom 73 of the barrel 72 and the bottom surface 93*b* of the bearing recess 93 is set to be slightly longer than an entire axial length of the worm 80. Consequently, the worm 80 is disposed in such a manner that the worm 80 is loosely held between the center lower surface 73*b* of the bottom 73 of the barrel 72 and the bottom surface 93*b* of the bearing recess 93 in the entire axial length. As a result, the worm 80 is axially movable relative to the motor shaft 78 by a very short distance. Upward movement of the worm 80 is locked by abutment between the center lower surface 73*b* of the bottom 73 of the barrel 72 and a rear end face (upper end face) 80*d* of the worm 80. Downward movement of the worm 80 is locked by abutment between the bottom surface 93*b* of the bearing recess 93 and the distal end face (lower end face) 80*c* of the worm 80. In this way, since the worm 80 is axially movable relative to the motor shaft 78 by a very short distance, the worm 80 is prevented from being compressed from the axially-opposite sides simultaneously during rotation and thus smooth rotation of the worm 80 can be maintained. As illustrated in FIG. 8C, which is a diagram of end faces of the distal end 80*a* of the worm 80 and the bearing recess 93 cut at the position indicated by arrows G-G in FIG. 1, between the distal end 80*a* of the worm 80 and the bearing recess 93, a radial gap g3 is formed fully circumferentially. This gap g3 is formed so as to have a size that prevents an outer circumferential surface (i.e., the outer peripheral surface) 80*b* of the distal end 80*a* of the worm 80 and an inner circumferential surface (i.e. the surrounding inner surface) 93*a* of the bearing recess 93 from coming into contact with each other when the worm 80 is rotating. Accordingly, even if the worm 80 is radially moved or inclined relative to the motor shaft 78 during rotation of the worm 80, contact between the outer circumferential surface 80*b* of the distal end 80*a* of the worm 80 and the inner circumferential surface 93*a* of the bearing recess 93 can be avoided. Therefore, generation of abnormal sound can be prevented. The radial gap g3 between the distal end 80*a* of the worm 80 and the bearing recess 93 can be formed so as to, for example, be larger than the radial gap g1 between the motor shaft 78 and the center hole 83 of the worm 80. More specifically, where the gap g1 is 0.05 mm, the gap g3 can be set to be, for example, 1 mm.

In FIG. 1, line c is a line extending through a position of a center of the worm wheel 50 and orthogonal to the axis direction of the motor shaft 78. A position of the worm wheel 50 in the axis direction of the motor shaft 78 is set in such a manner that line c extends through an area in which the motor shaft 78 is present in the axis direction of the motor shaft 78. If the position of the worm wheel 50 is set in the axis direction of the motor shaft 78 in such a manner that line c extends through a further distal area, in the axis direction of the motor shaft 78, relative to the distal end of the motor shaft 78 (for example, if the motor shaft 78 is short and the distal end of the motor shaft 78 is located at a position above line c), a force of the worm wheel 50 pressing the worm 80 acts at a position that is further distal relative to the distal end of the motor shaft 78. As a result, the radial gap g1 between the motor shaft 78 and the center hole 83 of the worm 80 causes the worm 80 to be inclined relative to the motor shaft 78 with the distal end position of the motor shaft 78 as a point of support. On the other hand, as in the arrangement in FIG. 1, where the position of the worm wheel 50 is set in the axis direction of the motor shaft 78 in such a manner that line c extends through the area in which the motor shaft 78 is present in the axis direction of the motor shaft 78 (where the distal end of the motor shaft 78 is located at a position that is the same as or below line c), the force of the worm wheel 50 pressing the worm 80 acts directly on the area in which the motor shaft 78 is present. As a result, no such inclination of the worm 80 with the distal end position of the motor shaft 78 as a point of support occurs. Consequently, inclination of the worm 80 relative to the axis direction of the motor shaft 78 when the worm 80 is rotating can be reduced. As a result, even where the outer circumferential surface 80*b* of the distal end 80*a* of the worm 80 and the inner circumferential surface 93*a* of the bearing recess 93 are not in contact with each other, the worm 80 can be rotated stably.

In particular, in the arrangement in FIG. 1, the position of the worm wheel 50 in the axis direction of the motor shaft 78 is set in such a manner that line c extends through an area in which the circular rod 78*a* is present in the axis direction of the motor shaft 78. If the position of the worm wheel 50 in the axis direction of the motor shaft 78 is set in such a manner that line c extends through an area in which the engagement rod 78*b* is present in the axis direction of the motor shaft 78, the force of the worm wheel 50 pressing the worm 80 acts on the engagement rod 78*b*. As a result, change in inclination of the worm 80 relative to the axis direction of the motor shaft 78 occurs depending on a rotational position of the motor shaft 78, which may result in occurrence of backlash in rotation of the worm 80. On the other hand, as in the arrangement in FIG. 1, where the position of the worm wheel 50 in the axis direction of the motor shaft 78 is set in such a manner that line c extends through the area in which the circular rod 78*a* is present in the axis direction of the motor shaft 78, the force of the worm wheel 50 pressing the worm 80 acts on the circular rod 78*a*. As a result, change in inclination of the worm 80 relative to the axis direction of the motor shaft 78 depending on a rotational position of the motor shaft 78 is less likely to occur. Consequently, the worm 80 can be rotated more stably.

According to experiments conducted by the inventors, it was confirmed that in the arrangement in FIG. 1, while abnormal sound is generated where settings are made so that gap g1=gap g3=0.05 mm, no such abnormal sound is generated where settings are made so that gap g1=0.05 mm and gap g3=1 mm.

Although the above embodiment, the non-engagement rod is formed of a circular rod and the non-engagement hole is formed of a circular hole, a cross-sectional shape of each of the non-engagement rod and the non-engagement hole is not limited to a circle. In other words, the non-engagement rod and the non-engagement hole each can be formed in, e.g., a regular polygonal shape having a large number of corners in cross-section so that the non-engagement rod and the non-engagement hole do not engage with each other in the direction of rotation. Also, although the above embodiment has been described in terms of the case where this invention is applied to an electric retractable rear view mirror for a vehicle, this invention is not limited to this case. In other words, this invention is applicable to any of an electric retractable rear view camera for a vehicle, the rear view camera being mounted on a door of a vehicle so as to protrude to the lateral side of the vehicle, other electric retractable rear-view devices for a vehicle and electric retractable view devices for a vehicle for purposes other than a rear view purpose, instead of applying this invention to a door mirror. An electric retractable rear view camera for a vehicle can be formed as, for example, one obtained by forming the visor 14 in FIG. 2 so as to have a small size and, instead of the mirror plate, mounting a camera in the visor 14 in such a manner that an optical axis of the camera faces the rear side of the vehicle when the visor 14 is in a use position.

The invention claimed is:

1. An electric retractable view device for a vehicle, the view device comprising:
    a motor;
    a worm having an upper end and a distal end opposite the upper end, the worm including a center hole allowing a motor shaft of the motor to be inserted therein, thereby the worm being fitted on the motor shaft in a direction around an axis of the motor shaft and being driven to rotate;
    a worm wheel that engages the worm and rotates following the worm; and
    a frame having a worm wheel receiving space and a worm receiving space,
    the worm wheel being accommodated within the worm wheel receiving space, and
    the worm being accommodated within the worm receiving space so as to be rotatable around a longitudinal axis of the worm, the worm receiving space comprising: (i) a columnar shape having a diameter that is larger than a diameter of the worm, (ii) an opening provided at a first end of the columnar shape, and (iii) a bottom provided at a second end of the columnar shape, wherein the bottom opposes the opening in an axial direction of the columnar shape, wherein the longitudinal axis of the worm extends in a longitudinal axis direction of the columnar shape, and a peripheral wall surface of the worm receiving space has a worm wheel entry port, an outer circumferential surface of the worm wheel being configured to pass through the worm wheel entry port and engage the worm within the columnar shape of the worm receiving space, a bearing recess defined at the bottom of the worm receiving space, and wherein a diameter of the bearing recess is smaller than a diameter of the columnar shape, wherein the bearing recess receives the distal end of the worm, wherein the distal end of the worm is unaffixed so as to allow an outer peripheral surface of the distal end of the worm to move towards and away from a surrounding inner surface of the bearing recess, wherein a distal end face of the distal end of the worm is in abutment with and supported on an opposing surface of the bearing recess; and a radial gap and rotational play are formed between the motor shaft and the center hole of the worm, a radial gap is formed between the outer peripheral surface of the distal end of the worm and the surrounding inner surface of the bearing recess, the radial gap between the outer peripheral surface of the distal end of the worm and the surrounding inner surface of the bearing recess is formed so as to have a size that prevents the outer peripheral surface of the distal end of the worm and surrounding inner surface of the bearing recess from coming into contact with each other when the worm is rotating, and the view device being configured so that rotation of the worm wheel is transmitted to a view device rotating section of the view device to rotate the view device rotating section in a direction around an axis of rotation relative to a vehicle body and thereby move the view device rotating section to an extended position and a retracted position.

2. The electric retractable view device for a vehicle according to claim 1, wherein the radial gap between the outer peripheral surface of the distal end of the worm and the surrounding inner surface of the bearing recess is formed so as to be larger than the radial gap between the motor shaft and the center hole of the worm.

3. The electric retractable view device for a vehicle according to claim 2, wherein a position of the worm wheel is set in an axis direction of the motor shaft in such a manner that a line extending through a position of a center of the worm wheel and orthogonal to the axis direction of the motor shaft extends through an area in which the motor shaft is present in the axis direction of the motor shaft.

4. The electric retractable view device for a vehicle according to claim 3, wherein:

the motor shaft includes a non-engagement rod on a proximal end side and an engagement rod on a distal end side along the axis direction of the motor shaft;

the center hole of the worm includes a non-engagement hole on a proximal end side and an engagement hole on a distal end side along an axis direction of the center hole;

in a state in which the motor shaft is inserted in the center hole of the worm, the non-engagement rod and the non-engagement hole face each other so as to be unengageable with each other in respective directions around axes of the non-engagement rod and the non-engagement hole, and the engagement rod and the engagement hole face each other so as to be engageable with each other in respective directions around axes of the engagement rod and the engagement hole; and the position of the worm wheel is set in the axis direction of the motor shaft in such a manner that the line extending through the position of the center of the worm wheel and orthogonal to the axis direction of the motor shaft extends through an area in which the non-engagement rod is present in the axis direction of the motor shaft.

5. The electric retractable view device for a vehicle according to claim 1, wherein a position of the worm wheel is set in an axis direction of the motor shaft in such a manner that a line extending through a position of a center of the worm wheel and orthogonal to the axis direction of the motor shaft extends through an area in which the motor shaft is present in the axis direction of the motor shaft.

6. The electric retractable view device for a vehicle according to claim 5, wherein:

the motor shaft includes a non-engagement rod on a proximal end side and an engagement rod on a distal end side along the axis direction of the motor shaft;

the center hole of the worm includes a non-engagement hole on a proximal end side and an engagement hole on a distal end side along an axis direction of the center hole;

in a state in which the motor shaft is inserted in the center hole of the worm, the non-engagement rod and the non-engagement hole face each other so as to be unengageable with each other in respective directions around axes of the non-engagement rod and the non-engagement hole, and the engagement rod and the engagement hole face each other so as to be engageable with each other in respective directions around axes of the engagement rod and the engagement hole; and the position of the worm wheel is set in the axis direction of the motor shaft in such a manner that the line extending through the position of the center of the worm wheel and orthogonal to the axis direction of the motor shaft extends through an area in which the non-engagement rod is present in the axis direction of the motor shaft.

7. The electric retractable view device for a vehicle according to claim 1, wherein:

when the worm is rotating, the worm is movable, relative to the motor shaft, in the axis direction of the motor shaft; and movement of the worm in a direction toward the distal end of the worm is locked by abutment between the distal end face in the axis direction of the worm and the opposing surface of the bearing recess.

* * * * *